United States Patent [19]

Hayes et al.

[11] 4,172,369

[45] Oct. 30, 1979

[54] FLEXIBLE COUPLING

[76] Inventors: Raymond J. Hayes; Charles J. Hayes, both of 661 R. W. Harris Industrial Dr., Manton, Mich. 49663

[21] Appl. No.: 885,520

[22] Filed: Mar. 13, 1978

[51] Int. Cl.$^2$ .............................................. F16D 3/64
[52] U.S. Cl. ................................... 64/14; 64/27 NM
[58] Field of Search ............ 64/14, 27 NM; 403/356, 403/358, 359

[56] References Cited

U.S. PATENT DOCUMENTS

| 827,023 | 7/1906 | Knoener | 403/358 |
|---|---|---|---|
| 1,992,528 | 2/1935 | Geger | 64/14 |
| 2,158,212 | 5/1939 | Anderson | 64/14 |
| 2,197,631 | 4/1940 | Doran | 403/356 |
| 2,716,334 | 8/1955 | Scott | 64/14 |
| 2,902,842 | 9/1959 | Byrom | 64/14 |
| 3,410,112 | 11/1968 | Gawreliak | 64/14 |
| 3,552,145 | 7/1968 | Barton | 64/14 |
| 3,662,568 | 5/1972 | Kashima | 64/14 |

FOREIGN PATENT DOCUMENTS

| 1260082 | 3/1961 | France | 64/14 |
|---|---|---|---|
| 668765 | 3/1952 | United Kingdom | 64/14 |

Primary Examiner—Charles J. Myhre
Assistant Examiner—R. C. Turner
Attorney, Agent, or Firm—Allen D. Gutcess, Jr.

[57] ABSTRACT

A flexible coupling is provided for connecting ends of two shafts which may be misaligned. The coupling includes a first member which is attached to one of the shafts and a second member which is attached to the other shaft. Each of the members has three dogs extending toward the other member but spaced therefrom with a resilient drive insert located therebetween. The drive insert has an annular flange which extends around the dogs and between the members and specifically engages shoulders or recesses on both members. The dogs have negative angles so that in the event one of the members should become loose on its shaft, the dogs will still remain in engagement. Finally, hubs of the members have locking inserts which enable the hubs to accommodate different shaft shapes.

5 Claims, 6 Drawing Figures

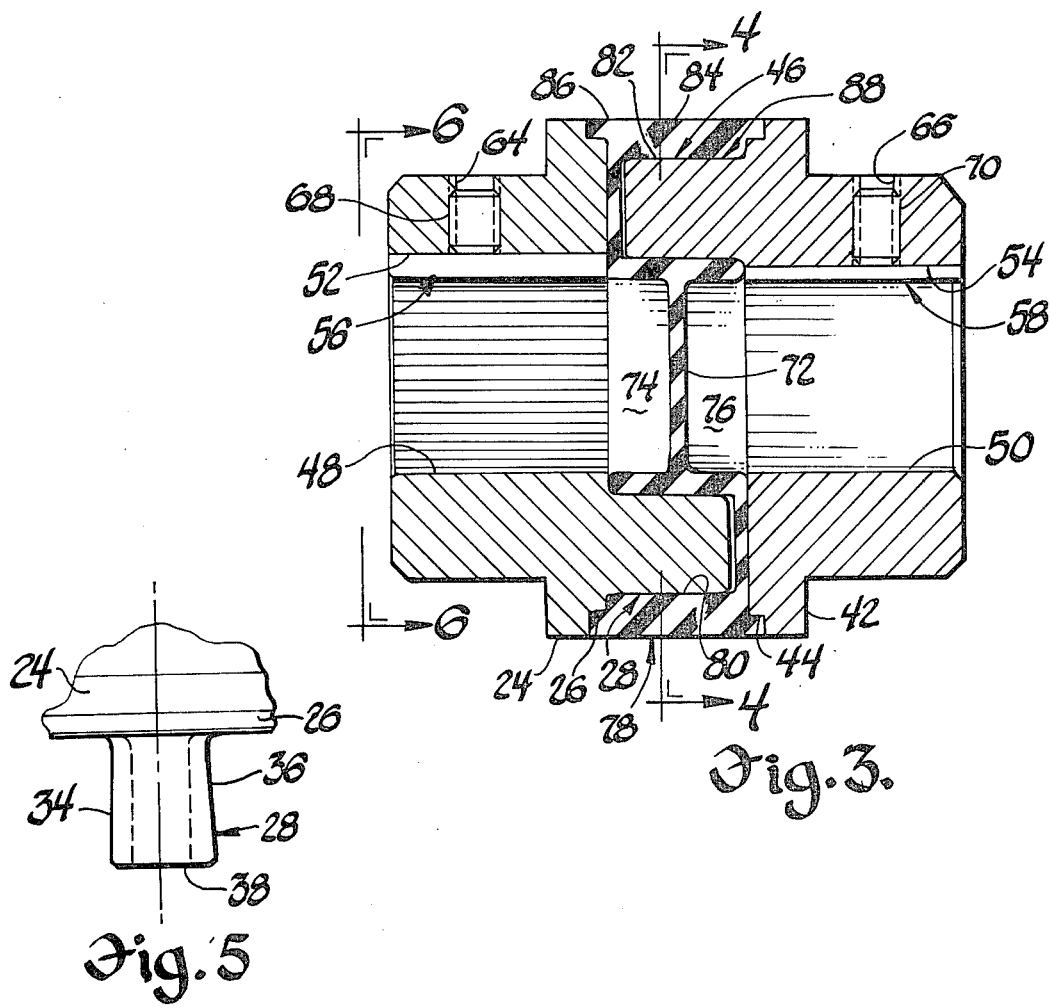
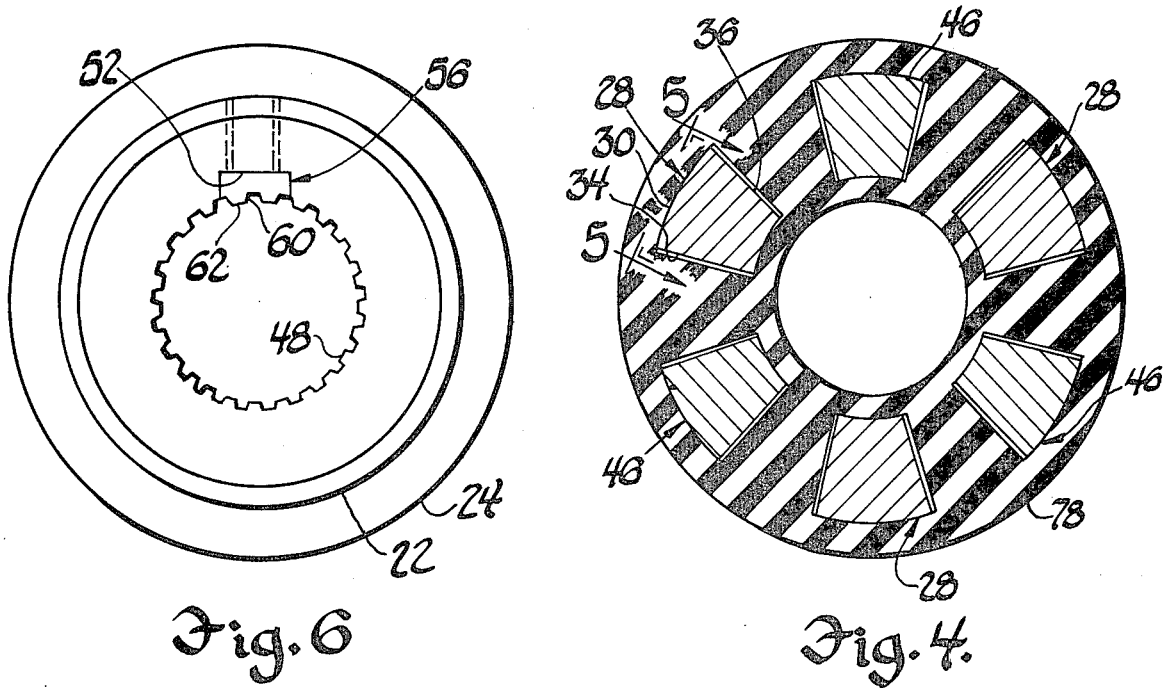

FLEXIBLE COUPLING

This invention relates to a flexible coupling for connecting ends of shafts which may be misaligned.

The following patents are the closest known prior art: U.S. Pat. Nos. 1,780,727; 2,025,825; 2,034,001; 2,716,334; 2,891,395; and 3,396,556.

The new flexible coupling includes a first member attachable to one of the shafts and a second member attachable to the other shaft, with the two members preferably being identical. Each of the members has drive dogs which extend toward the other member, with a resilient drive insert located between the members and between the dogs. The drive insert has a large annular flange extending between the members to completely seal out dirt and to control expansion of the drive insert during rotation of the shafts. The dogs are designed with small negative angles or rakes which enable the dogs to remain in driving engagement even if one of the members becomes loose on its shaft. In addition, hubs of the members feature locking inserts which enable the hubs to be attached to shafts of various shapes.

It is, therefore, a principal object of the invention to provide a flexible coupling having a resilient drive insert between two members attached to shafts, with the insert having a wide annular flange extending between the members.

Another object of the invention is to provide a flexible coupling with a locking insert capable of accommodating shafts of various shapes.

Many other objects and advantages of the invention will be apparent from the following detailed description of a preferred embodiment thereof, reference being made to the accompanying drawings, in which:

FIG. 3 is a view in longitudinal cross section of the coupling;

FIG. 4 is a view in transverse cross section taken along the line 4—4 of FIG. 3;

FIG. 5 is a fragmentary view of a drive dog of the coupling, taken along the line 5—5 of FIG. 4; and FIG. 6 is an end view of the coupling, taken along the line 6—6 of FIG. 3.

Figure 1:
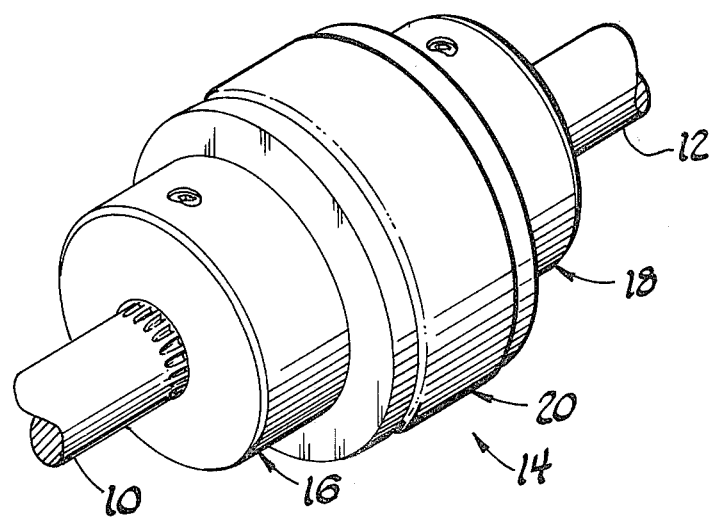
FIG. 1 is a view in perspective of a flexible coupling embodying the invention.
Figure 2:
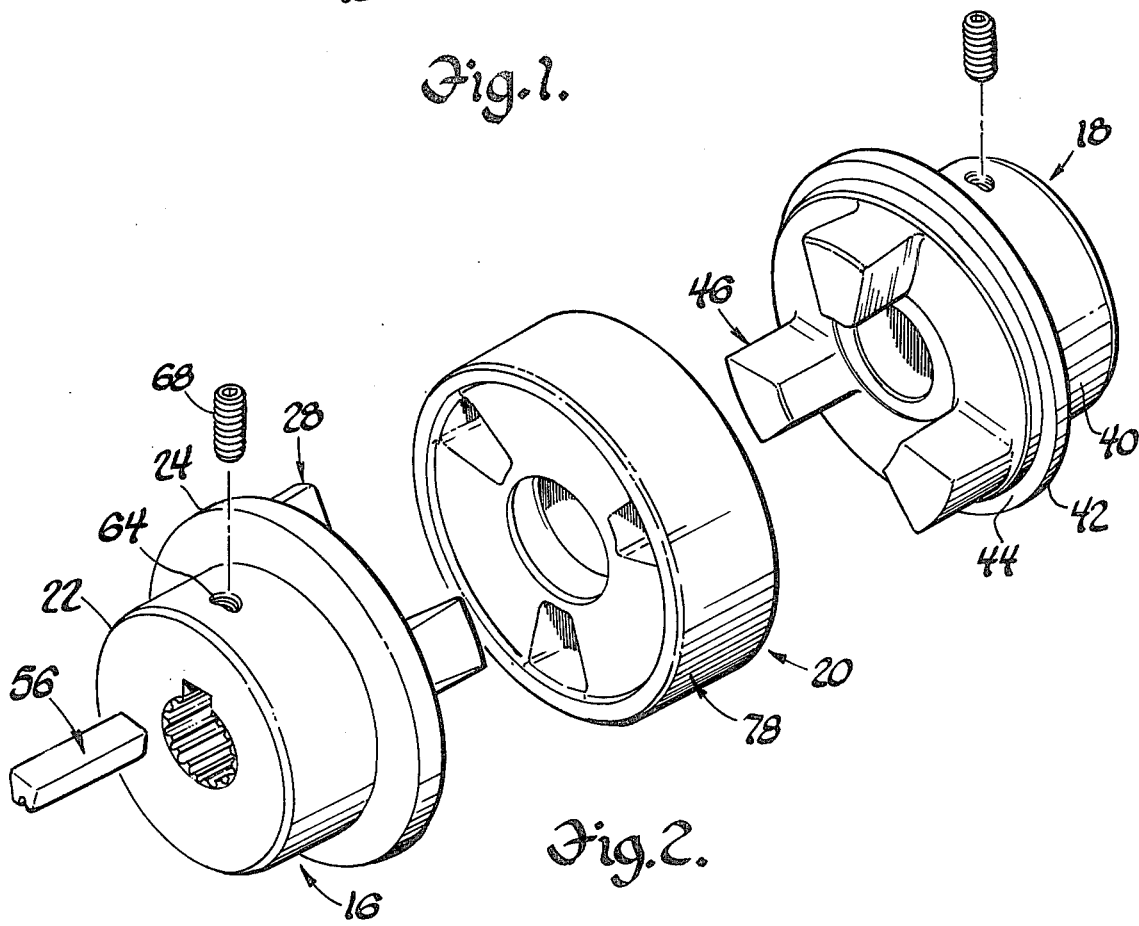
FIG. 2 is an exploded view in perspective of the coupling of FIG. 1.

Referring particularly to FIG. 1, two shafts 10 and 12, the shaft 10 being a drive shaft and the shaft 12 a drive shaft, in this instance, are connected by a flexible coupling 14 embodying the invention. The coupling 14 includes a first drive member 16 attached to the shaft 10 and a second driven member 18 attached to the shaft 12, with a resilient drive insert 20 located therebetween. The drive member 16 includes a hub 22 and a circular drive plate 24 having an annular shoulder or recess 26 at the outer edge thereof away from the hub 22.

Three drive dogs 28 extend from the drive plate 24 toward the driven member 18. The dogs 28 are of generally trapezoidal shape (FIG. 4) with arcuate outer surfaces 30, arcuate inner surfaces 32, and straight side walls 34 and 36. As shown in FIG. 5, the side walls 34 and 36 can diverge in a direction away from the circular plate 24, toward outer end walls 38 and the other member 18, with the side walls forming angles of about two degrees with respect to centerlines of the dogs. This angle, which can be from one degree to three degrees, enables the dogs to remain in engagement even though one of the drive or driven members 16 and 18 should become loose on its respective shaft. However, the side walls 34 and 36 can also be parallel to the centerlines of the dogs to prevent axial motion and vibration.

The driven member 18 is similar to the drive member 16 and includes a hub 40, a circular plate 42 with a shoulder or recess 44 and dogs 46. The dogs 46 are identical to the dogs 28 and will not be discussed further. The dogs 28 and 46 are spaced apart a distance about equal to the width of one dog, as shown in FIG. 4.

The drive and driven members 16 and 18 should be capable of being attached to a variety of shafts. For this purpose, the hub 22 can have a splined passage or bore 48 and the hub 40 can have a straight passage or bore 50 with longitudinally-extending main grooves 52 and 54 which are of rectangular cross-sectional shape. A locking insert 56 is in the groove 52 and a key 58 is in the groove 54. The insert is shown as having at least one spline groove 60 and two splines 62 which match the grooves and splines of the splined bore 48.

Tapped holes 64 and 66 in the hubs 22 and 40 receive setscrews 68 and 70 which, when turned into the holes 64 and 66, force the locking insert 56 and the key 58 against the shafts 10 and 12 to provide a secure connection for a variety of shaft shapes, including square and hexagonal. Of course, other means can be employed to attach the hubs to shafts, if desired.

In a preferred form, the resilient drive insert 20 is made of a neoprene with a durometer in the range of 50 to 90, and preferably about 70. However, the insert can also be made of urethane, rubber, or similar materials. The insert 20 has a circular central web 72 (FIG. 3) forming two cylindrical recesses 74 and 76 on each side thereof to receive the ends of the shafts, if they extend that far. Surrounding the recesses 74 and 76 is a heavy ring 78 in which are formed three trapezoidal-shaped recesses 80 to receive the dogs 28 and three similar recesses 82 on the opposite side to receive the dogs 46. The adjacent recesses 80 and 82 are spaced apart a distance approximately equal to the size of the dogs 28 and 46, as shown in FIG. 4. This relatively large amount of space between the recess and the dogs enables angular misalignment to be accommodated more effectively. The walls of the recesses 80 and 82 are preferably at least 1/16th inch thick between the members 16 and 18. This promotes quiet operation of the coupling to a high degree.

At the outer surface of the ring 78 is a wide flange 84 terminating in circular edge portions 86 and 88 which engage the recesses 26 and 44 of the hubs 16 and 18. The wide flange 84 minimizes the possibility of dirt entering between the drive and driven members 16 and 18 and substantially prevents gaps between the insert and the drive and driven members even when misaligned. The thicker central portion of the flange 84 also controls the expansion of the drive insert 20 when the drive and driven members are rotated at higher speeds.

Various modifications of the above-described preferred embodiment of the invention will be apparent to those skilled in the art, and it is to be understood that such modifications can be made without departing from the scope of the invention, if they are within the spirit and the tenor of the accompanying claims.

We claim:

1. A flexible drive coupling comprising a first member, means for connecting said first member to an end of a first shaft, said first member having a cylindrical periphery, a first annular recess at the periphery facing toward said second member, and a first plurality of dogs extending from said first member; a second member, means for connecting said second member to an end of a second shaft, said second member having a cylindrical periphery with a diameter equal to the diameter of the cylindrical periphery of said first member, a second annular recess at the periphery facing toward said first annular recess, a second plurality of dogs extending from said second member toward said first said member, with said dogs of said second member extending into spaces between said dogs of said first member; a drive insert located between said first and second members, said drive insert having oppositely-facing annular surfaces with recesses receiving said dogs in closely fitting relationship, said drive insert also having an outer cylindrical flange with annular, squared edges of equal diameter extending beyond said oppositely-facing annular surfaces and fitting with said annular recesses of said first and second members to bridge the space between said first and second members to substantially prevent the entrance of dirt therebetween, the diameter of said cylindrical flange being substantially equal to, and not exceeding, the diameter of said cylindrical peripheries of said first and second members.

2. A flexible drive coupling according to claim 1 characterized by said squared edges of said outer cylindrical flange being thinner than the central portion of said cylindrical flange between said edges.

3. A flexible drive coupling comprising a first member, means for connecting said first member to an end of a first shaft, said first member having a cylindrical periphery, a first annular recess at the periphery facing toward said second member, and a first plurality of dogs extending from said first member, said dogs having side walls which diverge over their entire length in a direction toward the other member; a second member, means for connecting said second member to an end of a second shaft, said second member having a cylindrical periphery, a second annular recess at the periphery facing toward said first annular recess, a second plurality of dogs extending from said second member toward said first member, said dogs of said second plurality having side walls which diverge over their entire length in a direction toward said first member, with said dogs of said second member extending into spaces between said dogs of said first member; a resilient drive insert located between said first and second members, said drive insert having oppositely-facing annular surfaces with recesses receiving said dogs in closely fitting relationship, said drive insert also having an outer cylindrical flange with annular edges extending beyond said oppositely-facing annular surfaces and fitting with said annular recesses of said first and second members to bridge the space between said first and second membes to substantially prevent the entrance of dirt therebetween, the diameter of said cylindrical flange not exceeding the diameter of said cylindrical peripheries of said first and second members.

4. A flexible coupling according to claim 3 characterized by each of said side walls diverging at angles of approximately 2°.

5. A flexible drive coupling according to claim 3 characterized by said means for connecting said first member to an end of a first shaft comprising said member having a hub, said hub having a central passage therein, said hub having a threaded passage extending perpendicularly to said central passage, a locking insert extending into said central passage and having at least one spline groove extending parallel to said central passage, said hub having a setscrew for moving said locking insert toward said central passage, said second member having a second hub, said second hub having a second central passage extending therethrough, said second hub having a second threaded passage extending perpendicularly to said second central passage, a second locking insert extending into said second central passage and having at least one spline groove extending parallel to said second passage, said second hub having a second setscrew in said second threaded passage for moving said second insert toward said central passage.

* * * * *